(No Model.)
C. FULLER.
VEHICLE BRAKE.
No. 391,741. Patented Oct. 23, 1888.
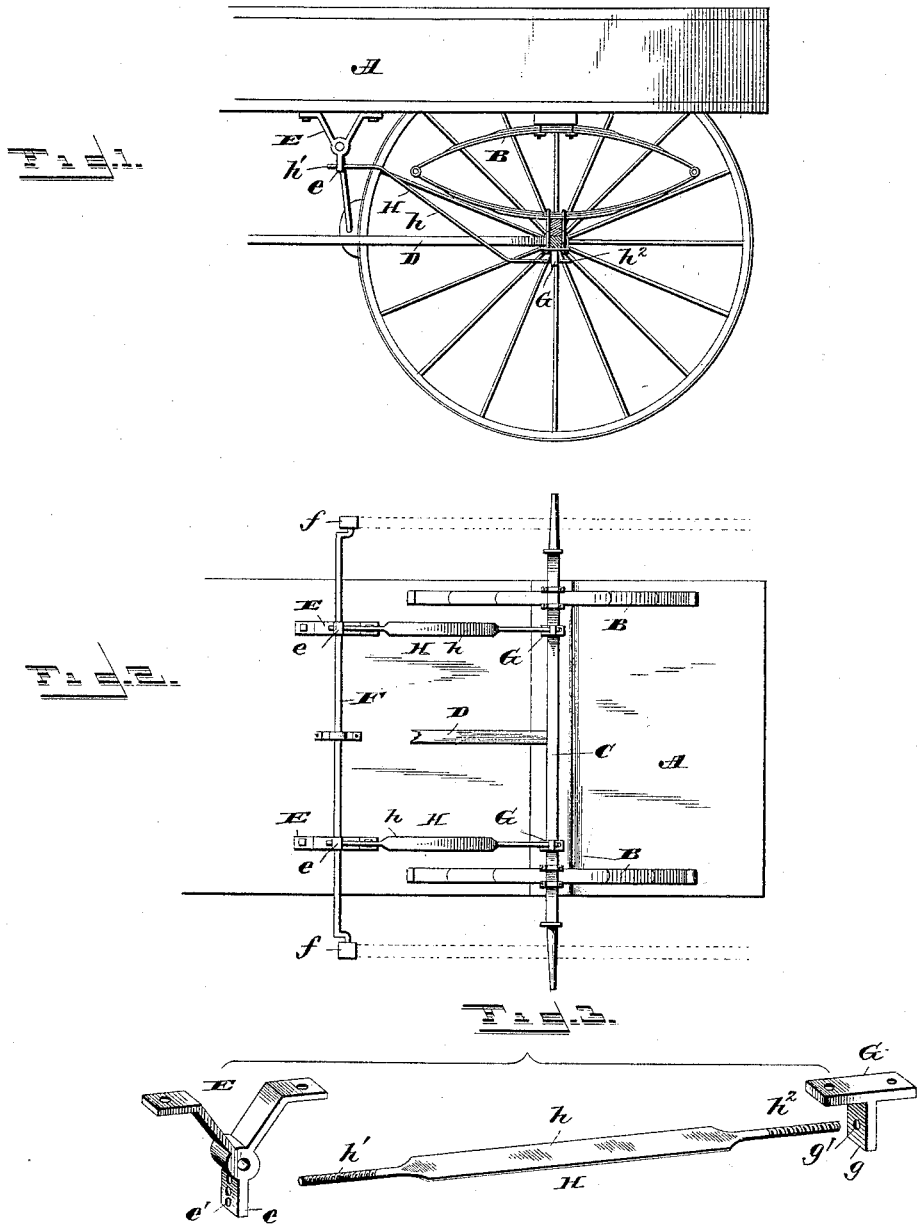
WITNESSES.
G. S. Elliott
E. W. Johnson
Charles Fuller,
INVENTOR,
by 
Attorney.

UNITED STATES PATENT OFFICE.

CHARLES FULLER, OF LUDELL, KANSAS.

VEHICLE-BRAKE.

SPECIFICATION forming part of Letters Patent No. 391,741, dated October 23, 1888.

Application filed June 26, 1888. Serial No. 278,216. (No model.)

*To all whom it may concern:*

Be it known that I, CHARLES FULLER, a citizen of the United States of America, residing at Ludell, in the county of Rawlins and State of Kansas, have invented certain new and useful Improvements in Vehicle-Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in attachments for brakes for vehicles, the object thereof being to provide rods or spring-bars which will prevent longitudinal movement of the body upon the axle and insure the brakes contacting properly with the wheels, the parts being so constructed that the vertical spring movement of the body will not be impaired; and it consists in the construction and combination of the parts, as will be hereinafter fully set forth, and specifically pointed out in the claims.

In the accompanying drawings, Figure 1 is a side view of the rear portion of a vehicle, showing my improvement applied thereto. Fig. 2 is a plan view of the under side of a vehicle. Fig. 3 are detached detail views.

A refers to the body of a vehicle supported by springs B B, of ordinary construction, which are connected to the hind axle, C, in the usual manner.

D refers to the reach-bar, which connects the hind axle to the front axle in the usual manner.

To the bottom of the body of the vehicle, slightly in front of the hind wheels, are secured brackets E E, which are provided with bearings for the brake-bar F, the outer end of said brake-bar being bent downwardly and provided with brake-blocks $ff$. The brake-bar may also be provided with or connected to a brake-lever of any improved pattern. The brackets E are provided beneath the bearings for the brake-bar with depending lugs $e$, which may be provided with a series of screw-threaded perforations, $e'$.

G refers to yokes clipped to the axle C in any suitable manner on a line with the brackets E E, and the depending projection $g$ has a screw-threaded perforation, $g'$, therein.

The connecting-rod H is provided with a central spring portion, $h$, and screw-threaded ends $h'$ and $h^2$, which engage, respectively, with the screw-threaded perforations $e'$ and $g'$ in the bracket and axle-yoke.

To attach my improvement to a vehicle, one end of the bar H is screwed into the depending portion $e$ of the bracket and the axle-yoke G screwed upon the opposite end and clipped to the axle, when the central portion will assume a downwardly-extending bend from the bracket E. By means of this device the body is prevented from moving longitudinally upon the axle, and when the brake-blocks are pressed against the wheels there can be no forward movement of the body, thus insuring an even pressure of the brake-blocks upon the wheels, and the distance between the brake-blocks and wheels is maintained so that a uniform pressure can be exerted.

Having thus described my invention, I claim—

1. The combination, with a vehicle provided with springs and a brake, of the brackets E, supporting the brake-bar and provided with depending portions $e\ e$, with screw-threaded perforations, connecting-rod H, having a central spring portion and oppositely screw-threaded ends, yokes G G, attached to the hind axle on a line with the brackets E, the parts being combined and organized to prevent longitudinal movement of the body upon the axle and at the same time allow the body to vibrate vertically upon its supporting-springs.

2. In combination with the brackets E, attached to the body of a vehicle, yokes attached to the axle, and bars H, having screw-threaded ends which engage with the brackets and yokes, substantially as shown.

In testimony whereof I affix my signature in presence of two witnesses

CHARLES FULLER.

Witnesses:
    EDWIN A. NILES,
    JAMES C. COLE.